United States Patent [19]

Mukari

[11] Patent Number: 5,315,638
[45] Date of Patent: May 24, 1994

[54] METHOD FOR PROGRAMMING OF INSTALLATION DATA IN A MOBILE TELEPHONE

[75] Inventor: Timo Mukari, Oulu, Finland

[73] Assignee: Nokia Mobile Phones Ltd., Salo, Finland

[21] Appl. No.: 882,453

[22] Filed: May 12, 1992

[30] Foreign Application Priority Data

May 31, 1991 [FI] Finland ................................. 912640

[51] Int. Cl.⁵ .......................................... H04M 11/00
[52] U.S. Cl. ........................................ 379/58; 379/59; 379/387
[58] Field of Search .................... 379/58, 59, 354, 355, 379/356, 387

[56] References Cited

U.S. PATENT DOCUMENTS

| | | |
|---|---|---|
| 4,234,964 | 11/1980 | Cieslak et al. . |
| 4,245,352 | 1/1981 | Karpowycz et al. . |
| 4,523,155 | 6/1985 | Walczak et al. . |
| 4,580,274 | 4/1986 | Debany, Jr. et al. . |
| 4,613,990 | 9/1986 | Halpern . |
| 4,710,969 | 12/1987 | Fluck, Jr. et al. . |
| 5,091,919 | 2/1992 | Kuisma . |

FOREIGN PATENT DOCUMENTS

| | | |
|---|---|---|
| 0310876 | 4/1989 | European Pat. Off. . |
| 0378450 | 7/1990 | European Pat. Off. . |
| 2229340 | 9/1990 | United Kingdom . |
| 2248364 | 4/1992 | United Kingdom . |

Primary Examiner—Curtis Kuntz
Assistant Examiner—Dwayne D. Bost
Attorney, Agent, or Firm—Darby & Darby

[57] ABSTRACT

In the method according to the invention, the initialization data of a mobile telephone are installed directly in the rapid dialing memory or by using the rapid dialing memory, in which case the installation program transfers to the nonvolatile memory the data fed from the mobile telephone keyboard to the rapid dialing memory.

8 Claims, 2 Drawing Sheets

METHOD FOR PROGRAMMING OF INSTALLATION DATA IN A MOBILE TELEPHONE

CROSS-REFERENCES TO RELATED APPLICATIONS

This application is related to applicant's copending U.S. application Ser. No. 07/583,942.

BACKGROUND OF THE INVENTION

The present invention relates, in accordance with the preamble of claim 1, to a method for the programming of installation data in a mobile telephone.

Before a mobile telephone is taken into use, the initialization or installation data have to be programmed into it. These data may include the calling number of the mobile telephone itself, the traffic zone, and/or the system within which the telephone will be used, the identification code of the salesperson and/or the installer of the data, the date of the programming of the installation data, and other corresponding data which are prerequisites for the use of the mobile telephone.

Conventionally, installation data have been installed in a mobile telephone either at the factory or by the salesperson. In this case usually some programming apparatus has been used as an aid, for example a personal computer programmed for this purpose, through which the installation data have been fed into the nonvolatile memory of the mobile telephone. Such a solution is expensive, since it requires a separate apparatus, and additionally a suitable interface must be arranged between the programming apparatus and the mobile telephone. Alternatively, it is also conceivable that there is arranged in the mobile telephone a program by means of which it would be possible, via the operating keyboard, to feed the installation data into the nonvolatile memory. The software for such an arrangement and the recording of data during the programming have a high memory requirement in the mobile telephone, thus increasing the costs of the telephone. In the nonvolatile memory the installation data are retained also during the replacement of telephone batteries or during other disturbances in electricity supply.

SUMMARY OF THE INVENTION

The object of the invention is installation data programming which can be done more economically than it can in the stat of the art. This object is achieved by the method according to claim 1. Another advantageous method is achieved with the characteristics of claim 2. Other embodiments of the invention are disclosed in the dependent claims.

DETAILED DESCRIPTION OF THE INVENTION

The invention is described below with the help of embodiment examples.

The method of the present invention for the programming of installation data is applied to a mobile telephone which has logic circuitry controlling the operation, for example a microprocessor. A microprocessor involves, in a manner known, a nonvolatile memory for installation data and an operating memory in which operating software and rapid dialing numbers can be recorded. By means of the software recorded in the memory the microprocessor is able to read and execute in a conventional manner the dialing orders contained in the rapid dialing memory. A program for processing the installation data is recorded in the memory of the microprocessor.

According to the present invention, the installation data of a mobile telephone are recorded at predetermined memory addresses of the rapid dialing memory by a known method for programming rapid dialing numbers from the operating keyboard of the telephone. At this time the code data corresponding to the installation data are recorded in a telephone number address in a table in the memory. To simplify the installation program, the installation data are recorded for this purpose at predetermined memory addresses. The data to be recorded are, as stated in the preamble, the calling number of the mobile telephone itself, the traffic zone, and/or the system within which the mobile telephone is to be used, the identification code of the salesperson and/or the installer of the data, the date of the programming of the installation data, and other similar installation data.

Thereafter the program for the recording of installation data is booted up from the operating keyboard by a predetermined keystroke sequence by means of which the program for the recording of installation data transfers the installation data recorded in the memory addresses in the rapid dialing memory to the nonvolatile memory.

In another embodiment, protection of certain rapid dialing memory addresses is provided in the program for the processing of installation data. In this case, only the booting up of the program for the processing of installation data releases these predetermined memory addresses so that they are visible on the screen of the mobile telephone when installation data are being programmed. Thereafter the programming will continue in the same manner as in the case described above. At the end of the programming, the program again prevents the use of these memory addresses used for the programming of installation data before a shift is made to the normal operating mode.

The program for the recording of installation data may also include a sequence in which the correctness of the data which have been fed in are checked before being recorded in the non-volatile memory, i.e. that the data are within the permitted limit values.

BRIEF DESCRIPTION OF THE DRAWINGS

In the following, the invention is described in more detail with reference to the enclosed drawings, wherein.

DESCRIPTION OF THE PREFERRED EMBODIMENTS

Figure 1:
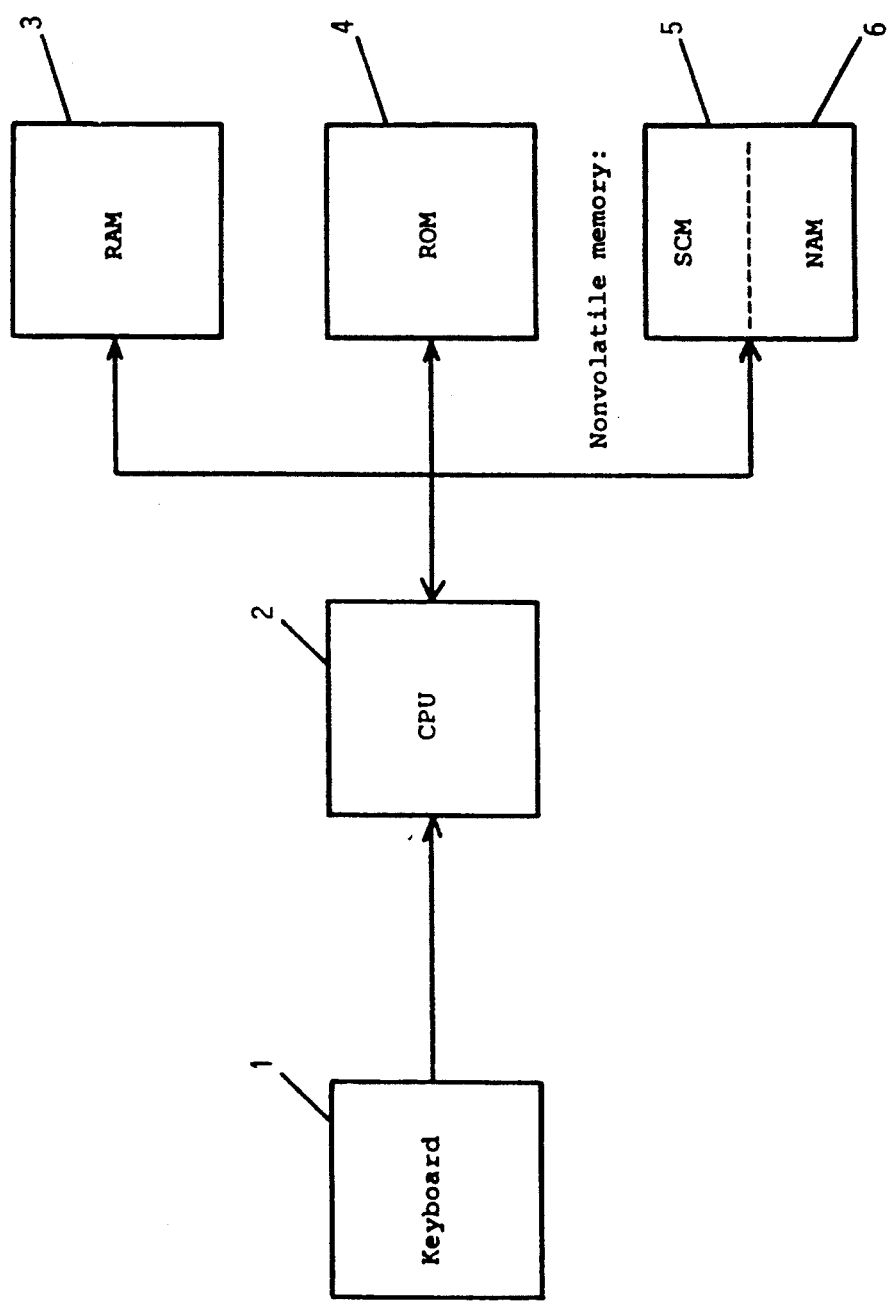
FIG. 1 is a block diagram of a system employing the present invention and FIG. 2 shows a flow chart of the programming process.

The activation sequence and the installation data are provided over the keyboard 1 to the central processing unit 2, said unit having associated therewith an operating memory or random access memory 3, a read-only memory 4, and a nonvolatile memory reducing a short code memory 5 and a number assignment 6, that is the final module for storing the installation data.

Figure 2:
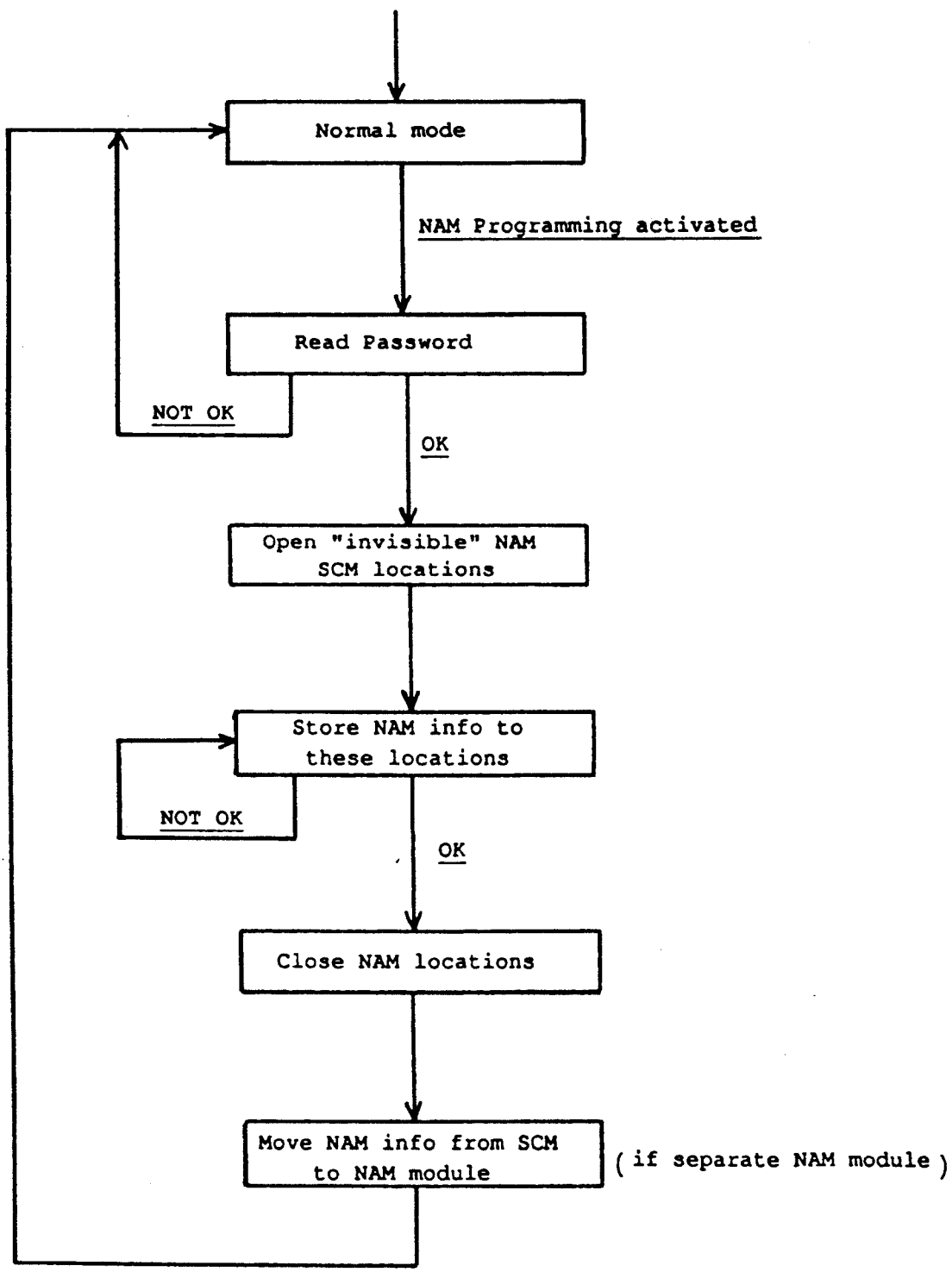

As seen from FIG. 2, upon receipt of activation sequence and password, NAM info is stored momentarily in opened SCM locations. Thereafter NAM locations are closed and the NAM info, that is the installation data is transferred to the NAM module.

It could be noted here that the use of an activation sequence as such in connection with programming is known, of course, but the method of using the SCM as an intermediate store for the installation data is the essential new feature of the incubation.

It has been proposed here that the program for the recording of installation data can be booted up only by a secret keystroke sequence from the operating keyboard of the mobile telephone. This keystroke sequence is made available for only installers and salespersons, but not for the users of the mobile telephones.

In order to prevent programming of installation data inadvertently or with intent to misuse, a base for a protection element may be arranged on the printed circuit board of the mobile telephone. This protection element may be, for example, a suitable resistor element and/or an active element which, when installed in the base, releases the facility for the programming of installation data. Thus the salesperson or installer will install the protection element in the mobile telephone for the duration of the programming. Before recording the data in the nonvolatile memory, the program for the recording of installation data checks that the protection element has been correctly installed in the base. If it is not there, installation data are not recorded. Alternatively, the recording of installation data could be prevented when the protection element is installed in the base.

The method according to the invention makes the program for the recording of installation data very short, and so it can be easily linked to the operating memory of a mobile telephone. The program substantially has only a short keystroke code recognition sequence for booting up program steps, sequences for transferring data from one memory address to another, and certain checking sequences. Space for data need not be reserved in the operating memory, since the installation data are fed in via the rapid dialing memory. The rapid dialing program in the telephone is utilized in the recording of the data. The recording program and the rapid dialing program are preferably placed in the nonvolatile memory, in which case a disturbance possibly occurring in electricity supply will not affect the programs.

In addition, if the rapid dialing memory itself is located in the nonvolatile memory, the sequence may be further simplified so that the installation data need not be transferred from the rapid dialing memory to the nonvolatile memory; they are left programmed at memory addresses invisible to the user in the manner described above. When the telephone is switched on, the installation data are in this case read directly from the rapid dialing memory addresses, or they are first transferred to the operating memory.

I claim:

1. A method for the programming of installation data in a mobile telephone, the mobile telephone having an operation-controlling logic, a nonvolatile memory for the installation data, and an operating memory in which operating programs and rapid dialing numbers can be recorded, the logic being capable, on the basis of the recorded programs, of reading and executing any dialing and other orders contained in them, characterized in that the method comprises the steps of:
   a) arranging a program for the processing of installation in the nonvolatile memory,
   b) recording the installation data of the mobile telephone at predetermined memory addresses in the rapid dialing memory by a known method for the programming of rapid dialing numbers,
   c) booting up the program for the recording of installation data and
   d) transferring to the nonvolatile memory by means of the program for the recording installation data, the installation data recorded at the said memory addresses in the rapid dialing memory.

2. A method for the programming of installation data in a mobile telephone, the mobile telephone having an operation-controlling logic, a nonvolatile memory for the installation data, and an operating memory in which operating programs and rapid dialing numbers can be recorded, the logic being capable, on the basis of the recorded programs, of reading and executing any dialing and other orders contained in them, characterized in that the method comprising the steps of:
   a1) arranging a program for the processing of installation data,
   a2) booting up the program for the processing of installation data, releasing in a first routine of the predetermined memory addresses of the rapid dialing memory for programming and for display on the screen of the mobile telephone,
   b) recording the installation data of the mobile telephone at said released memory addresses of the rapid dialing memory by a known method, for the programming of rapid dialing numbers,
   c) booting up a routine second of the program for the recording of installation data, whereupon
   d) transferring the program for the recording of installation data which is recorded at the predetermined memory addresses of the rapid dialing memory to the nonvolatile memory of the mobile telephone, and
   e) preventing, by means of the program for the recording of installation data, the programming of said predetermined memory addresses and their display on the screen before a shift is made to the normal operating mode of the mobile telephone.

3. A method according to claim 1 or 2, characterized in that the recording program additionally checks that the installation data in the rapid dialing memory are within predetermined limit values.

4. A method according to claim 1 or 2, characterized in that the program for the recording of installation data is booted up by a secret keystroke sequence from the operating keyboard of the mobile telephone.

5. A method according to claim 1 or 2, characterized in that the execution of step d) is prevented if an element protecting the installation data has been installed in the mobile telephone.

6. A method according to claim 1 or 2, characterized in that the execution of step d) is prevented unless an element permitting the recording of installation data has been installed in the mobile telephone.

7. A method according to claim 1 or 2, characterized in that the rapid dialing numbers, and thereby also the installation data, are recorded directly in the nonvolatile memory, in which case a separate transfer from the rapid dialing memory to the nonvolatile memory is not necessary.

8. A method according to claim 1 or 2, characterized in that the transfer of the installation data to the operating memory from the nonvolatile memory is started when the telephone is switched on.

* * * * *